US012506299B2

(12) United States Patent
Lee et al.

(10) Patent No.: US 12,506,299 B2
(45) Date of Patent: Dec. 23, 2025

(54) CABLE COUPLING CONNECTOR FOR VEHICLE DOOR

(71) Applicants: Hyundai Motor Company, Seoul (KR); Kia Corporation, Seoul (KR); Tyco Electronics AMP Korea Co., Ltd., Gyeongsan-si (KR)

(72) Inventors: Cheol Hun Lee, Suwon-si (KR); Chang Ho Lee, Gyeongsan-si (KR); Kun Teak Lim, Gyeongsan-si (KR)

(73) Assignees: Hyundai Motor Company, Seoul (KR); Kia Corporation, Seoul (KR); Tyco Electronics AMP Korea Co., Ltd., Gyeongsan-Si (KR)

( * ) Notice: Subject to any disclaimer, the term of this patent is extended or adjusted under 35 U.S.C. 154(b) by 310 days.

(21) Appl. No.: 18/470,688

(22) Filed: Sep. 20, 2023

(65) Prior Publication Data

US 2024/0204453 A1 Jun. 20, 2024

(30) Foreign Application Priority Data

Dec. 19, 2022 (KR) ........................ 10-2022-0178375

(51) Int. Cl.
*H01R 13/627* (2006.01)
*H01R 13/631* (2006.01)

(52) U.S. Cl.
CPC ....... *H01R 13/6271* (2013.01); *H01R 13/631* (2013.01); *H01R 2201/26* (2013.01)

(58) Field of Classification Search
CPC .............. H01R 13/6271; H01R 13/631; H01R 2201/26; H01R 13/639; H01R 13/633; H01R 24/005; H01R 13/629
See application file for complete search history.

(56) References Cited

U.S. PATENT DOCUMENTS 7,479,022 B2 * 1/2009 Lee .................. H01R 13/62911 439/157
2008/0076286 A1 * 3/2008 Lee .................. H01R 13/62911 439/259
2019/0109408 A1 * 4/2019 Maddens ............... H01R 13/52
2021/0211022 A1 * 7/2021 Schmitt ..................... H02K 3/28
2024/0204453 A1 * 6/2024 Lee .................... H01R 13/6271

FOREIGN PATENT DOCUMENTS

CN 104868281 A * 8/2015 ............. H01R 13/58
KR 20090112479 A 10/2009

* cited by examiner

*Primary Examiner* — Abdullah A Riyami
*Assistant Examiner* — Nader J Alhawamdeh
(74) *Attorney, Agent, or Firm* — Slater Matsil, LLP

(57) ABSTRACT

An embodiment cable coupling connector includes an outer connector including a terminal housing and an outer combination unit, a connector hook on the outer combination unit, an inner connector including a coupling cap unit coupled to a cable inside of a vehicle body, a terminal unit extending from the coupling cap unit, and an inner combination unit coupled with the outer combination unit by being inserted thereinto while surrounding lateral sides of the terminal unit, a plug covering the outer combination unit and connected to a cable pulled out of the vehicle door and to the terminal unit, a pressing portion on the plug, and a slide lever inserted between the outer and inner combination units and pressing against the connector hook toward a direction of the pressing portion to lock the connector hook to the pressing portion and to couple the outer connector and the plug.

18 Claims, 6 Drawing Sheets

CABLE COUPLING CONNECTOR FOR VEHICLE DOOR

CROSS-REFERENCE TO RELATED APPLICATIONS

This application claims the benefit of Korean Patent Application No. 10-2022-0178375, filed on Dec. 19, 2022, which application is hereby incorporated herein by reference.

TECHNICAL FIELD

The present disclosure relates to a cable coupling connector for a vehicle door.

BACKGROUND

Electric devices, such as a power window, a motor-driven side mirror, and a speaker, are installed on a vehicle door. Therefore, electric power and an operating signal have to be supplied to these electric devices in order to drive them.

Accordingly, a vehicle-body-side cable pulled out of a vehicle body and a door-side cable pulled out of a door are each provided, and the vehicle-body-side cable and the door-side cable are coupled using a connector structure. Thus, the electric power and the operating signal are applied to the electric device in a door.

A usual cable coupling connector for a vehicle door is structurally arranged on portions of a vehicle and a door that are to be coupled to each other. The vehicle-body-side cable and the door-side cable are pulled out to the outside toward the portions of the vehicle body and the door that are to be coupled to each other. The vehicle-body-side cable and the door-side cable pulled out in this manner are electrically coupled to each other by utilizing male-connector and female-connector structures.

However, the cable coupling connector for a vehicle door has to be structurally exposed to the portions of the vehicle body and the door that are to be coupled to each other. A problem with a structure of a cable connector that simply uses a male connector and a female connector is that, even in a state where the door is closed, the male connector and the female connector can be easily disconnected from each other by inserting a simple tool into a narrow gap between the portions of the vehicle body and the door that are to be coupled to each other.

When the vehicle-body-side cable and the door-side cable are disconnected from each other, an electrical signal may not be interrupted, and accordingly, a burglar alarm function is not performed. Thus, the structure of the cable connector has the problem of being susceptible to vehicle theft.

In addition, in a case where an external impact is applied due to vehicle vibration, vehicle accident, or the like, the male connector and the female connector may be disconnected from each other. In this case, a door button may not operate from the inside. Thus, there is also a problem in that an occupant may panic and be in a dangerous situation.

The contents described above are intended merely to aid in understanding the background of embodiments of the present disclosure and are not intended to mean that the present disclosure falls within the purview of the related art that is already known to a person of ordinary skill in the art.

SUMMARY

The present disclosure relates to a cable coupling connector for a vehicle door. Particular embodiments relate to a cable coupling connector for a vehicle door, the connector being capable of preventing easy unlocking by improving a fastening structure and thus enhancing the fastening ability.

An embodiment of the present disclosure provides a cable coupling connector for a vehicle door, the connector being capable of preventing easy unlocking by improving a fastening structure and thus enhancing the fastening ability.

Embodiments of the present disclosure are not limited to the embodiment mentioned above. From the detailed description of exemplary embodiments of the present disclosure, an embodiment not mentioned would be clearly understandable to a person of ordinary skill in the art.

According to an embodiment of the present disclosure, there is provided a cable coupling connector for a vehicle door, the cable coupling connector including an outer connector including a terminal housing as a lower portion thereof and an outer combination unit as an upper portion thereof on which a connector hook is formed, an inner connector including a coupling cap unit as a lower portion thereof and a terminal unit and an inner combination unit as an upper portion thereof, the coupling cap unit being coupled to a cable inside of a vehicle body, the terminal unit extending from the coupling cap unit, and the inner combination unit being combined with the outer combination unit by being inserted thereinto while surrounding lateral sides of the terminal unit, a plug covering the outer combination unit, a cable pulled out of a door being connected to the plug, the plug being connected to the terminal unit, and a pressing portion being formed on the plug, and a slide lever inserted between the outer combination unit and the inner combination unit and thus pressing against the connector hook toward a direction of the pressing portion, thereby locking the connector hook to the pressing portion and combining the outer connector and the plug with each other.

In the cable coupling connector, the connector hook of the outer connector may be formed by being cut in the shape of a quadrilateral cantilever from a wall surface of the outer combination unit, without one side of the connector hook being separated from the wall surface of the outer combination unit, so that the connector hook is rotated from the inside outward about the not-separated one side of the connector hook, and a connector locking protrusion may be formed in an outward protruding manner on a portion of the wall surface of the outer combination unit that is opposite in direction to the not-separated one side of the connector hook.

In the cable coupling connector, a locking groove may be formed in an inner surface of the pressing portion on the plug, and the connector locking protrusion may be locked to the locking groove by being inserted thereinto.

In the cable coupling connector, the slide lever may include a lever handler and a slide bar extending from the lever handler and inserted between the outer combination unit and the inner combination unit, wherein a lever hook may be formed on the slide bar by being cut in the shape of a quadrilateral cantilever from the slide bar, without one side of the lever hook being separated from the slide bar, so that the lever hook is rotated from the inside outward about the not-separated one side of the lever hook, wherein a lever pressing protrusion may be formed in an inward protruding manner on an inner surface of the lever hook, and a lever locking protrusion may be formed in an outward protruding manner on a portion of the slide bar that is opposite in direction to the not-separated one side of the lever hook, and wherein a guide protrusion may be formed in an inward protruding manner on an inner surface of the slide bar.

In the cable coupling connector, a guide rail that guides the guide protrusion through a movement path while the slide lever is inserted between the outer combination unit and the inner combination unit may be formed on an outer surface of the inner combination unit included in the inner connector, and a protruding inclination portion that forms an inclined surface gradually protruding outward along a direction in which the slide lever is inserted on a path along which the lever hook is rotated may be formed in the vicinity of the guide rail.

In the cable coupling connector, while the slide lever is inserted between the outer combination unit and the inner combination unit, the lever pressing protrusion on the lever hook may be brought into contact with the protruding inclination portion, thereby rotating the lever hook outward, and thus, the lever locking protrusion may press against the connector locking protrusion on the outer connector, thereby rotating the connector hook outward.

In the cable coupling connector, while the slide lever is inserted between the outer combination unit and the inner combination unit, the lever hook may be rotated outward, thereby rotating the connector hook outward, and thus the connector hook may be locked to the pressing portion.

In the cable coupling connector, when the pressing portion is pressed from the outside inward, the connector hook may be rotated inward, and thus may be unlocked from the pressing portion.

In the cable coupling connector, when the pressing portion is pressed from the outside inward, the connector hook may be rotated inward, thereby rotating the lever hook inward, and when the lever hook is rotated inward, the lever pressing protrusion on the lever hook may be slid along the protruding inclination portion, and thus the slide lever may be pulled out from between the outer combination unit and the inner combination unit.

In the cable coupling connector, the connector hooks of the outer connector that constitute a pair may be provided and arranged to be symmetrical about an imaginary line formed in a direction in which the slide lever is inserted, the lever hooks of the slide lever that constitute a pair may be provided and arranged to be symmetrical about the imaginary line, and the pressing portions on the plug that constitute a pair may be provided and arranged to be symmetrical about the imaginary line.

In the cable coupling connector, a first lever insertion opening into which a slide bar of the slide lever is inserted may be formed in a wall surface of the outer combination unit, a second lever insertion opening into which the slide bar of the slide lever is inserted may be formed in a wall surface of the plug, and the first lever insertion opening and the second lever insertion opening may communicate with each other.

In the cable coupling connector, the pressing portion on the plug may be pressed and return to an original shape thereof due to elasticity of a wall of the plug.

In the cable coupling connector, in the inner connector, a flange portion may be formed between the coupling cap unit and the inner combination unit and may be installed on a vehicle body, and thus the coupling cap unit may be arranged inside of the vehicle body, and the inner combination unit may be arranged outside of the vehicle body.

In the cable coupling connector, the slide lever may be formed in such a manner that a direction in which the slide lever is inserted between the outer combination unit and the inner combination unit and a direction in which the pressing portion formed on the plug is pressed are opposite directions.

According to an embodiment of the present disclosure, a structure is realized in which the inner connector, the outer connector, and the plug are combined with one another by performing an operation of inserting the slide lever between the outer combination unit and the inner combination unit. Particularly, the lever locking protrusion on the slide lever and the connector locking protrusion on the outer connector are kept locked to the pressing portion. Accordingly, the slide lever can be prevented from being released, as long as the pressing portion is intentionally pressed. Thus, the effect of enhancing the fastening ability of the cable coupling connector for a vehicle door can be expected.

In addition, because the slide lever is arranged in such a manner that the direction in which the slide lever is inserted or pulled out and the direction in which the pressing portion on the plug is pressed are opposite directions, forces have to be exerted at two points in order to pull out the slide lever. Because of this, in a state where the door is closed, it is impossible to perform an unlocking operation in the cable coupling connector through a narrow gap between the portions of the vehicle body and the door that are to be coupled to each other. Accordingly, the effect of preventing vehicle burglary can be expected.

BRIEF DESCRIPTION OF THE DRAWINGS

The above and other objects, features, and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Figure 1:
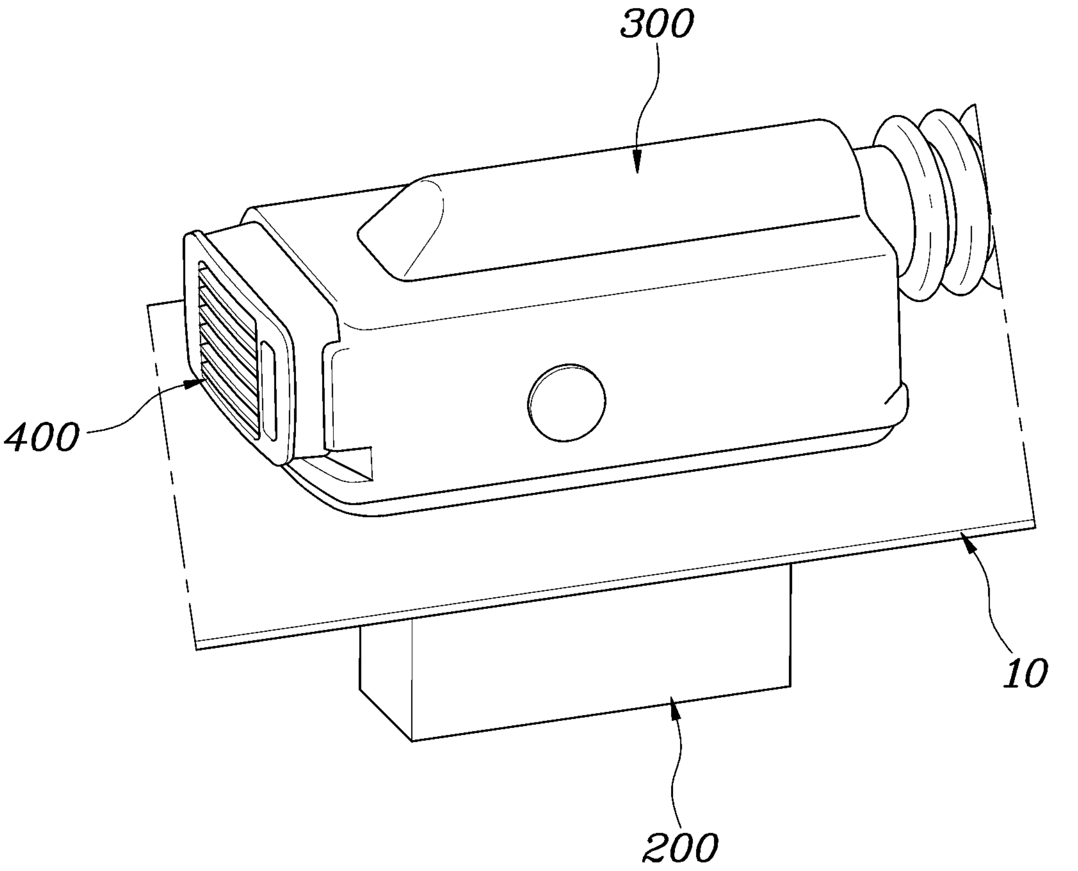
FIG. 1 is a perspective view illustrating a cable coupling connector for a vehicle door according to an embodiment of the present disclosure.

For the purpose of disclosure, embodiments of the present disclosure will be described in detail below referring to the accompanying drawings. The same or similar constituent elements are given the same reference numeral, and descriptions thereof are not repeated.

The terms "module" and "unit" are hereinafter interchangeably used to refer to a constituent element only for convenience in description in the present specification and therefore are not themselves intended to take on different meanings or to depict different functions.

In describing the embodiments of the present disclosure, a detailed description of a well-known technology related thereto will be omitted when determined as making the nature and gist of embodiments of the present disclosure obfuscated. In addition, the accompanying drawings serve only to help easily understand the embodiments disclosed in the present specification. It should be understood that the technical ideas disclosed in the present specification are not limited by the accompanying drawings and that any alteration of, any equivalent of, and any substitute for, a constituent element of embodiments of the present disclosure that fall within the scope of the technical ideas of embodiments of the present disclosure are included within the scope of the present disclosure.

The terms “first,” “second,” and so on are used to describe various constituent elements but do not impose any limitation on the various constituent elements. These terms are used only to distinguish one constituent element from another.

It should be understood that a constituent element, when referred to as being “coupled to” or “connected to” a different constituent element, may also be directly coupled to or directly connected to the different constituent element or may also be coupled to or connected to the different constituent element with a third constituent element in between. It should be understood that a constituent element, when referred to as being “directly coupled to” or “directly connected to” a different constituent element, may be coupled to or connected to the different constituent element with a third constituent element in between.

A noun in singular form has the same meaning as when used in plural form, unless it has a different meaning in context.

The terms “include,” “have,” and the like in the present application are intended to indicate that a feature, a number, a step, an operation, a constituent element, a component, or a combination of these, which is described in the specification, is present, and thus should be understood not to preclude the possibility that one or more other features, numbers, steps, operations, constituent elements, components, or combinations of these will be present or added.

Figure 2:
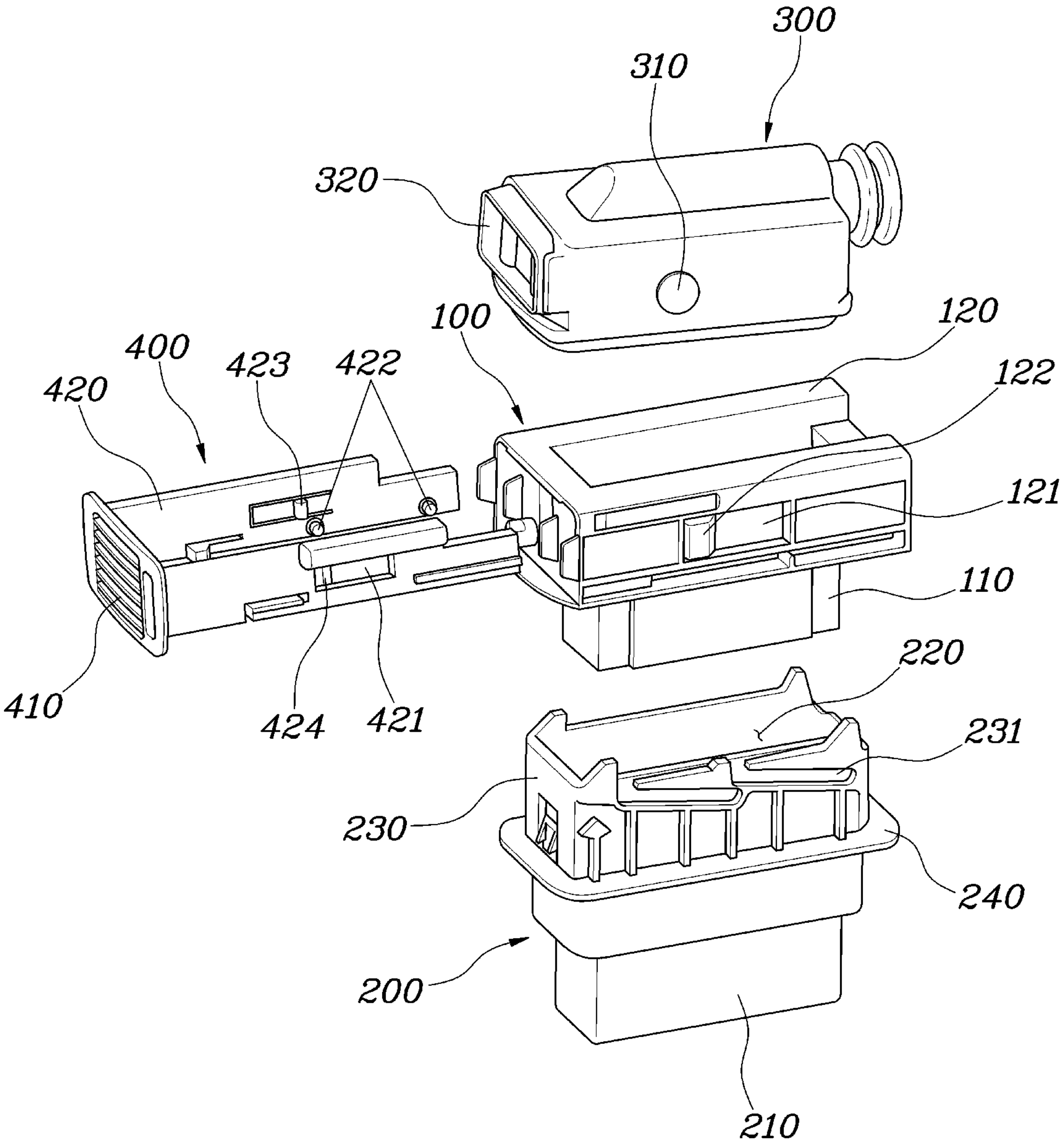
FIG. 2 is an exploded perspective view illustrating the cable coupling connector for a vehicle door according to an embodiment of the present disclosure.
Figure 3A:
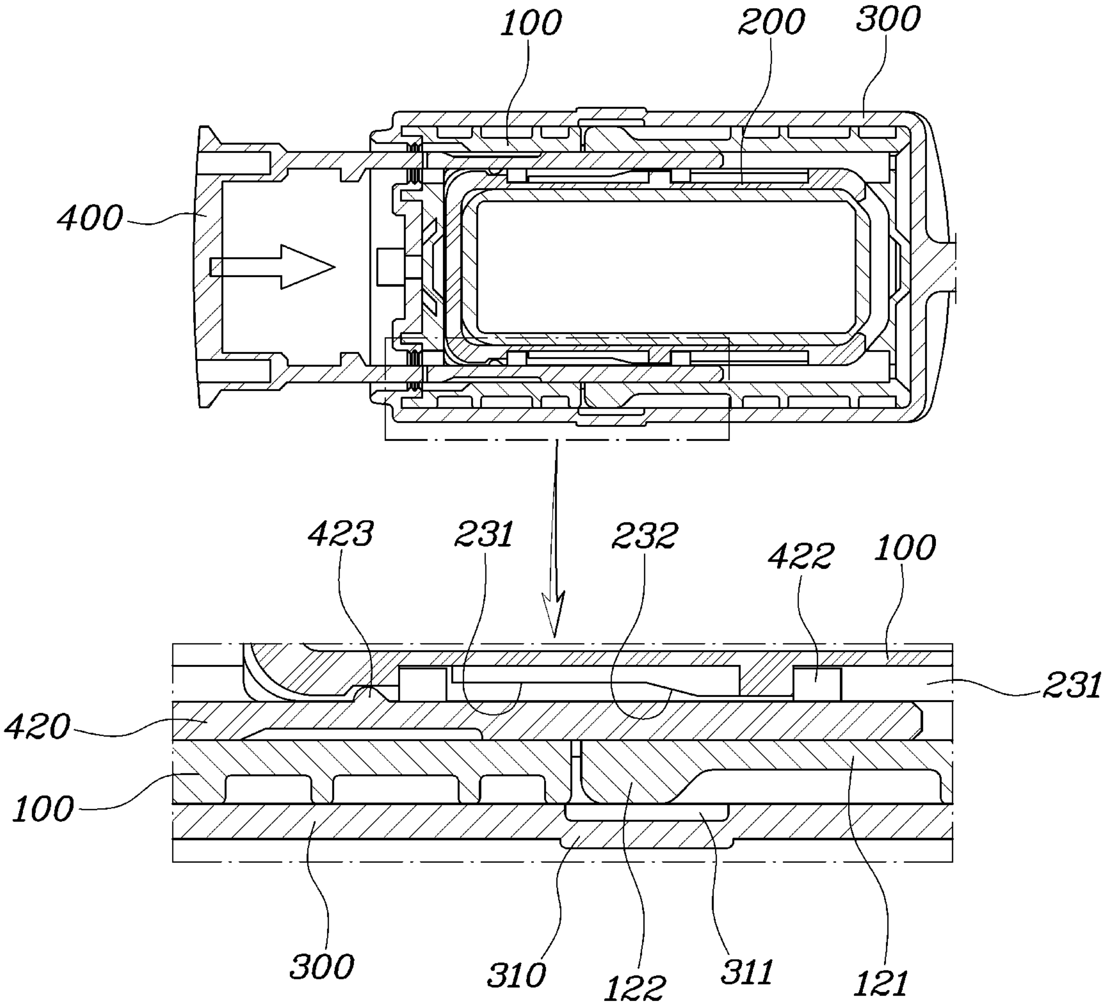
FIGS. 3A to 3C are views each illustrating a state where a locking operation is performed by the cable coupling connector for a vehicle door according to an embodiment of the present disclosure.
Figure 3B:
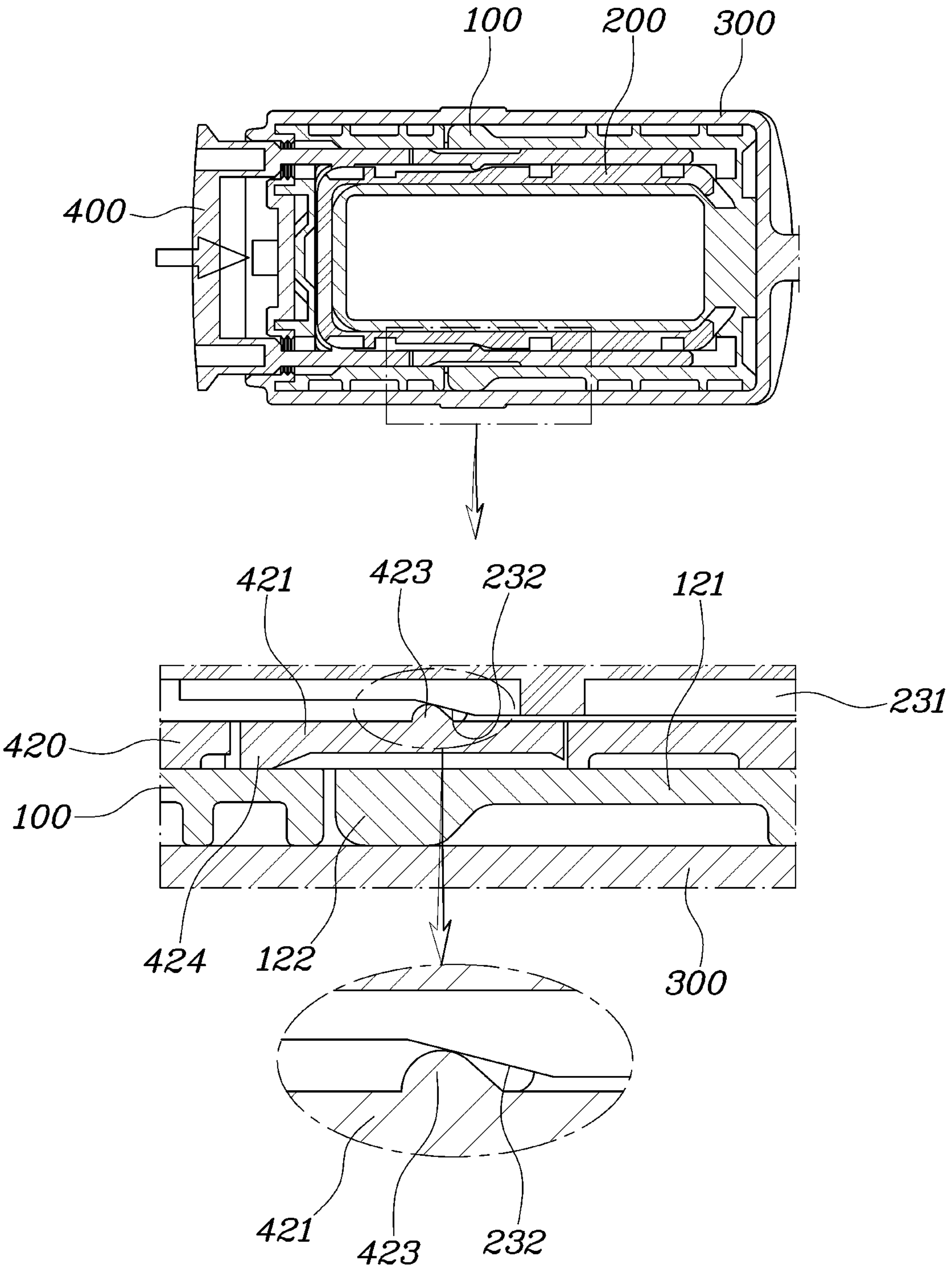
Figure 3C:
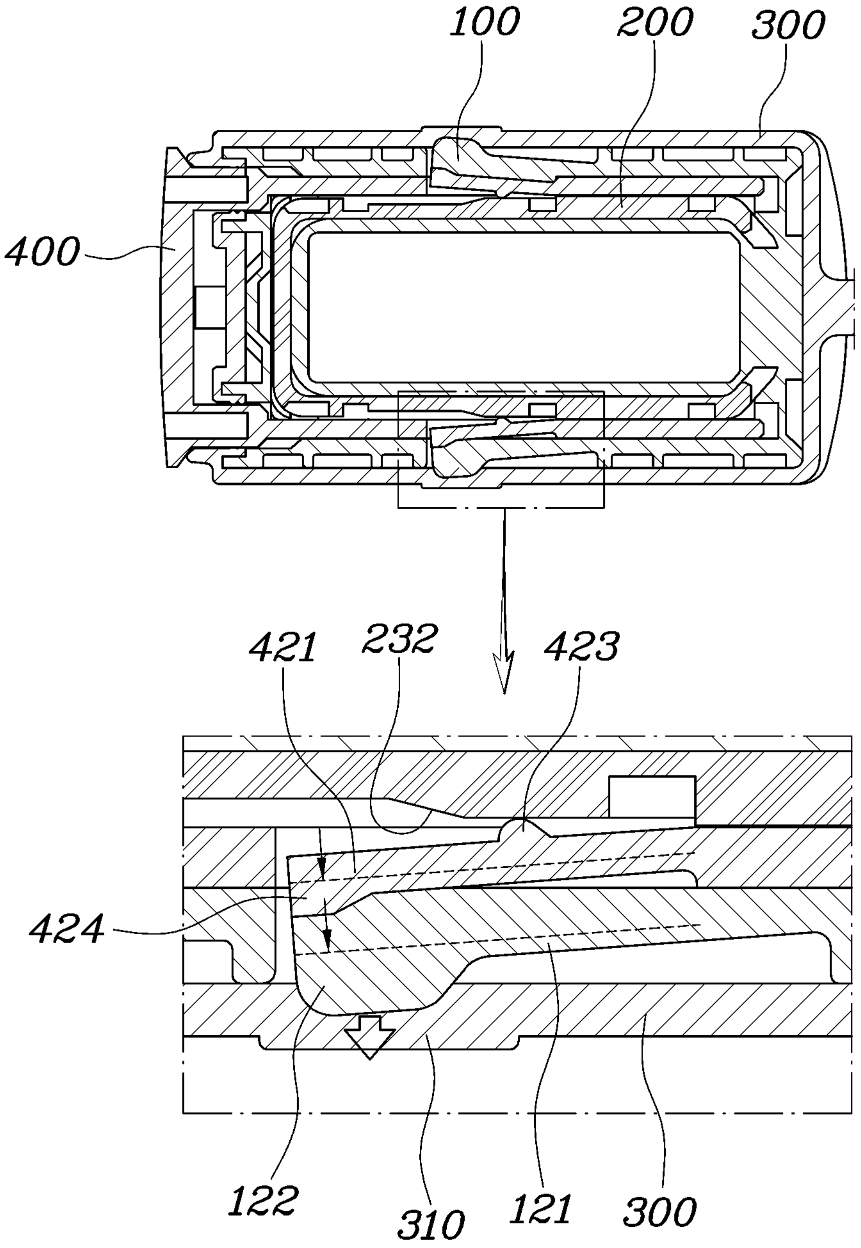
Figure 4:
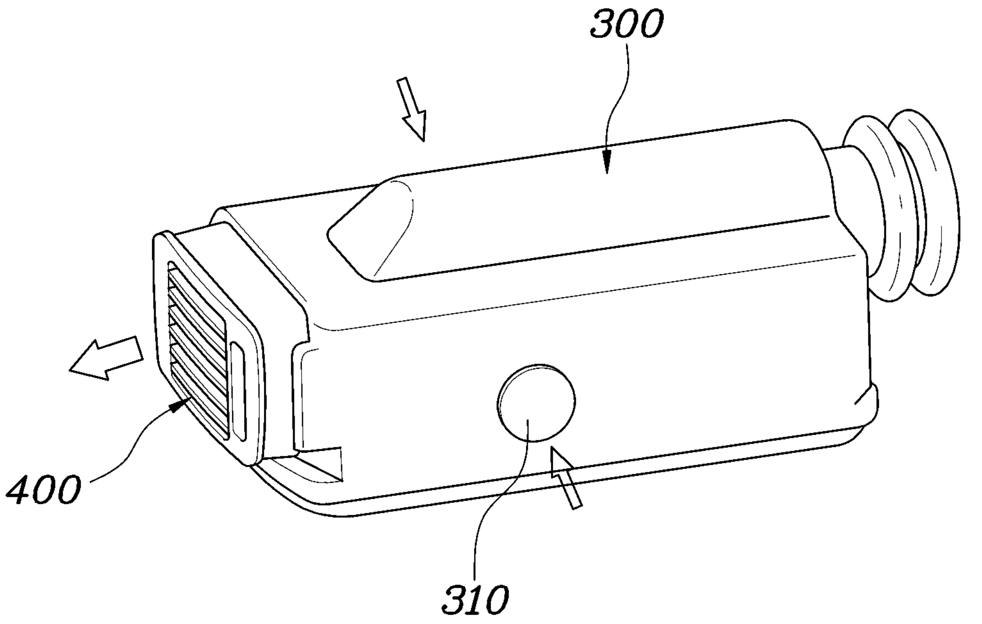
FIG. 4 is a view illustrating a state where an unlocking operation is performed by the cable coupling connector for a vehicle door according to an embodiment of the present disclosure.

FIG. 1 is a perspective view illustrating a cable coupling connector for a vehicle door according to an embodiment of the present disclosure. FIG. 2 is an exploded perspective view illustrating the cable coupling connector for a vehicle door according to an embodiment of the present disclosure. FIGS. 3A to 3C are views each illustrating a state where a locking operation is performed by the cable coupling connector for a vehicle door according to an embodiment of the present disclosure. FIG. 4 is a view illustrating a state where an unlocking operation is performed by the cable coupling connector for a vehicle door according to an embodiment of the present disclosure.

As illustrated in FIGS. 1 to 4, the cable coupling connector for a vehicle door broadly includes an outer connector 100, an inner connector 200, a plug 300, and a slide lever 400.

The inner connector 200 and the plug 300 are combined with each other with the outer connector 100 interposed therebetween. The outer connector 100 includes a terminal housing 110 as a lower portion thereof and an outer combination unit 120 as an upper portion thereof. A connector hook 121 is formed on the outer combination unit 120.

The terminal housing 110 employs the form of an approximately quadrilateral frame that has a quadrilateral through-hole in the upward-downward direction in the center. In this case, an internal structure of the terminal housing 110 may be shaped in a manner that corresponds to a shape of a terminal unit 220 provided in the inner connector 200 described below. Thus, the terminal unit 220 may be tightly combined with the terminal housing 110 by being inserted thereinto.

The outer combination unit 120 may extend from an upper end of the terminal housing 110 and may employ the form of an approximately “⊏”-shaped frame that has a quadrilateral through-hole in the upward-downward direction that is open at one lateral side. Of course, the outer combination unit 120 may also employ the form of an approximately quadrilateral frame that has a quadrilateral through-hole in the upward-downward direction in the center.

In this case, as many first lever insertion openings 123 as slide bars 420 are formed in a wall surface of the outer combination unit 120. Slide bars 420 of the slide lever 400 described below are inserted into the first lever insertion openings 123, respectively. According to the present embodiment, a pair of first lever insertion openings 123 is formed.

In addition, the connector hook 121 is formed on each of a pair of wall surfaces that extend from both end portions, respectively, of the wall surface, in which the first lever insertion opening 123 is formed, among wall surfaces of the outer combination unit 120.

The connector hook 121 is formed by being cut in the shape of a quadrilateral cantilever from the wall surface of the outer combination unit 120, without one side of the connector hook 121 being separated from the wall surface, so that the connector hook 121 is rotated from the inside outward about the not-separated one side of the connector hook 121. Therefore, the connector hook 121 is rotated by a predetermined angle from the inside outward about the one side thereof that is not separated from the wall surface of the outer combination unit 120.

A connector locking protrusion 122 is formed in an outward protruding manner on a portion of the wall surface of the outer combination unit 120 that is opposite in direction to the not-separated one side of the connector hook 121. Therefore, as the connector hook 121 is rotated, the connector locking protrusion 122 is rotated by a predetermined angle, thereby being locked to a pressing portion 310 on the plug 300.

The inner connector 200 includes a coupling cap unit 210 as a lower portion thereof. The coupling cap unit 210 is coupled to a cable inside of a vehicle body 10. The inner connector 200 includes the terminal unit 220 and an inner combination unit 230 as an upper portion thereof. The terminal unit 220 extends from the coupling cap unit 210. The inner combination unit 230 is combined with the outer combination unit 120 by being inserted thereinto while surrounding lateral sides of the terminal unit 220.

Particularly, in the inner connector 200, a flange portion 240 is formed between the coupling cap unit 210 and the inner combination unit 230. The flange portion 240 is installed on the vehicle body 10, thereby fixing the inner connector 200 to the vehicle body 10. At this point, the coupling cap unit 210 is arranged inside of the vehicle body 10, and the inner combination unit 230 is arranged outside of the vehicle body 10.

The coupling cap unit 210 is configured in such a manner as to be coupled to the cable inside of the vehicle body 10 and may be formed in various forms in such a manner as to possibly be coupled to the cable inside of the vehicle body 10.

The terminal unit 220 is configured to have the same form as a male connector and is formed in the shape of an approximately quadrilateral block.

The inner combination unit 230 extends from the flange portion 240 and employs the form of an approximately quadrilateral frame that has a quadrilateral through-hole in the upward-downward direction in the center. In this case, it is preferred that the inner combination unit 230 is formed in a manner that corresponds in shape to the outer combination unit 120, but in such a manner as to have a smaller size than the outer combination unit 120, and thus that a distance is maintained between an outer surface of the inner combination unit 230 and an inner surface of the outer combination unit 120. Furthermore, it is preferred that the inner combination unit 230 is formed in such a manner that the distance between the outer surface of the inner combination unit 230 and the inner surface of the outer combination unit 120 corresponds to a thickness of the slide bar 420 of the slide lever 400 described below.

A guide rail 231 and a protruding inclination portion 232 are formed on the outer surface of the inner combination unit 230. The guide rail 231 and the protruding inclination portion 232 realize a locking structure while guiding insertion or pulling-out of the slide lever 400. Respective structures of the guide rail 231 and the protruding inclination portion 232 will be described in detail in association with respective structures of the slide lever 400 and the plug 300 that will also be described below.

While the plug 300 covers the outer combination unit 120, a cable pulled out of a door is connected to the plug 300, and the plug 300 is connected to the terminal unit 220. The plug 300 is configured to have the same form as a female connector, and the pressing portion 310 for locking and unlocking is formed on the plug 300.

In this case, without the need to include a separate component providing a restoring force, the pressing portion 310 may be pressed and may return to an original shape thereof due to the property of the material of which the plug 300 is made. Therefore, it is preferred that the plug 300 is made of a plastic material having an elastic force of predetermined magnitude and an insulating property.

A locking groove 311 is formed in an inner surface of the pressing portion 310 on the plug 300. The connector locking protrusion 122 is locked to the locking groove 311 by being inserted thereinto.

In addition, as many second lever insertion openings 320 as the slide bars 420 are formed in a wall surface of the plug 300. The slide bars 420 of the slide lever 400 are inserted into the second lever insertion openings 320, respectively. According to the present embodiment, a pair of the second lever insertion openings 320 is formed.

Particularly, the first lever insertion opening 123 formed in the outer connector 100 and the second lever insertion opening 320 formed in the plug 300 are formed in such a manner as to communicate with each other. Thus, the slide bar 420 of the slide lever 400 passes through the second lever insertion opening 320 and the first lever insertion opening 123 at a time and thus is prevented from being separated from the plug 300 and the outer connector 100.

The slide lever 400 is inserted between the outer combination unit 120 and the inner combination unit 230 and combines the inner connector 200, the outer connector 100, and the plug 300 with one another. Thus, the inner connector 200, the outer connector 100, and the plug 300 are combined with one another and at the same time are locked or unlocked.

The slide lever 400 includes a lever handler 410 and a pair of the slide bars 420. The pair of the slide bars 420 extend from both end portions, respectively, of the lever handler 410, and are inserted between the outer combination unit 120 and the inner combination unit 230. Therefore, the slide lever 400 is formed in such a manner as to be approximately "⊏"-shaped.

In other words, an operator holds onto the lever handler 410 and then slides the slide lever 400, thereby inserting the slide lever 400 between the outer combination unit 120 and the inner combination unit 230 or removing them therefrom. The lever handler 410 may be formed in various forms. In the present embodiment, the lever handler 410 may be formed to have a wall surface in the shape of an approximately flat plate.

The slide bars 420 are formed to extend in parallel from both end portions, respectively, of the lever handler 410. Lever hooks 421 are formed on each of the pair of the slide bars 420.

In a similar manner as the connector hook 121 formed on the outer combination unit 120, the lever hook 421 is formed by being cut in the shape of a quadrilateral cantilever from the slide bar 420, without one side of the lever hook 421 being separated from the slide bar 420, so that the lever hook 421 is rotated from the inside outward about the not-separated one side of the lever hook 421.

Particularly, a lever pressing protrusion 423 is formed in an inward protruding manner on an inner surface of the lever hook 421. A lever locking protrusion 424 is formed in an outward protruding manner on a portion of the slide bar 420 that is opposite in direction to the not-separated one side of the lever hook 421.

In addition, a guide protrusion 422 is formed in an inward protruding manner on an inner surface of the slide bar 420. In this case, the guide protrusions 422 constituting a pair are formed in such a manner as to be spaced a predetermined distance away from each other along a direction in which the slide bar 420 extends.

The guide rail 231 is formed on the outer surface of the inner combination unit 230 included in the inner connector 200. The guide rail 231 guides the guide protrusion 422 through a movement path while the slide lever 400 is inserted between the outer combination unit 120 and the inner combination unit 230.

Then, the protruding inclination portion 232 is formed in the vicinity of the guide rail 231, preferably, on top of the guide rail 231. The protruding inclination portion 232 forms an inclined surface gradually protruding outward along a direction in which the slide lever 400 is inserted on a path along which the lever hook 421 is rotated.

Thus, while the slide lever 400 is inserted between the outer combination unit 120 and the inner combination unit 230, the lever pressing protrusion 423 on the lever hook 421 is brought into contact with the protruding inclination portion 232, thereby rotating the lever hook 421 outward by a predetermined angle.

The lever locking protrusion 424 presses against the connector locking protrusion 122 on the outer connector 100, thereby rotating the connector hook 121 outward in conjunction with the connector locking protrusion 122.

When the connector hook 121 is rotated outward in this manner, the connector locking protrusion 122 protruding outward from the connector hook 121 is inserted into the locking groove 311 formed in the pressing portion 310, thereby maintaining locking.

It is preferred that the slide lever is formed in such a manner that a direction in which the slide lever 400 is inserted between the outer combination unit 120 and the inner combination unit 230 and a direction in which the pressing portion 310 formed on the plug 300 is pressed are opposite directions. To pull out the slide lever 400, forces are required to be exerted in different directions at two points.

In addition, the connector hooks 121 of the outer connector 100 that constitute a pair are provided and arranged to be symmetrical about an imaginary line formed in a direction in which the slide lever 400 is inserted. In addition, the lever hooks 421 of the slide lever 400 that constitute a pair are provided and arranged to be symmetrical about the imaginary line. In addition, the pressing portions 310 on the plug 300 that constitute a pair are provided and arranged to be symmetrical about the imaginary line. In a case where the operator presses against the pair of the pressing portions 310 formed on the plug 300, directions in which the pair of the pressing portions 310 are pressed are set to be opposite directions. Thus, even in a state where the door is closed, the pair of the pressing portions 310 cannot be pressed at the same time at a narrow gap between respective connection portions of the vehicle body 10 and the door.

A state where the cable coupling connector for a vehicle door according to an embodiment of the present disclosure that is configured as described above operates is described as follows with reference to the drawings.

First, an operation of maintaining locking by combining the outer connector 100, the inner connector 200, and the plug 300 with one another and using the slide lever 400 is described.

As illustrated in FIG. 3A, the outer connector 100, the inner connector 200, and the plug 300 are sequentially combined with one another. In this state, the slide bar 420 of the slide lever 400 is inserted between the outer combination unit 120 and the inner combination unit 230. At this point, the slide bar 420 passes through the second lever insertion opening 320 and the first lever insertion opening 123 and thus is prevented from being separated from the plug 300 and the outer connector 100.

Then, the slide bar 420 is inserted, and the guide protrusion 422 protruding from the inner surface of the slide bar 420 starts to be guided along the guide rail 231 formed on the inner combination unit 230.

In this state, when the slide lever 400 is further inserted, as illustrated in FIG. 3B, the lever pressing protrusion 423 of the slide bar 420 is brought into contact with the protruding inclination portion 232, and thus the lever hook 421 starts to be rotated outward along the inclined surface of the protruding inclination portion 232.

Then, consecutively, when the slide lever 400 is further inserted, as illustrated in FIG. 3C, the lever hook 421 is rotated by a predetermined angle. Accordingly, the lever locking protrusion 424 protruding from an outer surface of the lever hook 421 presses against the connector locking protrusion 122 on the outer connector 100, thereby rotating the connector hook 121 outward in conjunction with the connector locking protrusion 122.

When the connector hook 121 is rotated outward in this manner, the connector locking protrusion 122 protruding outward from the connector hook 121 is inserted into the locking groove 311 formed in the pressing portion 310, thereby maintaining locking.

For unlocking, as illustrated in FIG. 4, the pair of the pressing portions 310 are pressed inward at the same time, and, at the same time, the slide lever 400 is pulled out in a direction in which the slide lever 400 is pulled out.

With the force exerted on the pressing portion 310, the pressing portion 310 is pressed from the outside inward, and thus, the connector hook 121 is rotated inward, thereby being unlocked from the pressing portion 310.

In addition, in conjunction with the connector hook 121, the lever hook 421 is also rotated inward. Thus, the lever pressing protrusion 423 of the lever hook 421 is slid along the protruding inclination portion 232. Accordingly, the connector hook 121 and the lever hook 421 return to their respective positions.

Then, unlocking is performed in the reverse order to that in which the operation of maintaining locking, which is described with reference to FIGS. 3A to 3C, is performed. Thus, the slide lever 400 may be pulled out from between the outer combination unit 120 and the inner combination unit 230. Accordingly, the outer connector 100, the inner connector 200, and the plug 300 may be sequentially pulled out.

The present disclosure is not limited to the embodiments thereof, which are described above with reference to the accompanying drawings, and the scope thereof is defined by the following claims. Therefore, it would be apparent to a person of ordinary skill in the art that various modifications and alterations may be made to the present disclosure without departing from the scope of the technical ideas of embodiments of the present invention.

What is claimed is:

1. A cable coupling connector for a vehicle door, the cable coupling connector comprising:

an outer connector comprising a terminal housing as a lower portion thereof and an outer combination unit as an upper portion thereof, wherein a connector hook is provided on the outer combination unit;

an inner connector comprising a coupling cap unit as a lower portion thereof and a terminal unit and an inner combination unit as an upper portion thereof, wherein the coupling cap unit is configured to be coupled to a cable inside of a vehicle body, wherein the terminal unit extends from the coupling cap unit, and wherein the inner combination unit is configured to be coupled with the outer combination unit by being inserted thereinto while surrounding lateral sides of the terminal unit;

a plug covering the outer combination unit, wherein the plug is configured to be connected to a cable pulled out of the vehicle door, wherein the plug is connected to the terminal unit, and wherein a pressing portion is provided on the plug; and a slide lever inserted between the outer combination unit and the inner combination unit and pressing against the connector hook toward a direction of the pressing portion to lock the connector hook to the pressing portion and to couple the outer connector and the plug with each other.

2. The cable coupling connector of claim 1, wherein the connector hook of the outer connector has a shape of a quadrilateral cantilever extending from a wall surface of the outer combination unit, and wherein a first side of the connector hook is not separated from the wall surface of the outer combination unit such that the connector hook is rotatable from an inside outward about the first side of the connector hook.

3. The cable coupling connector of claim 2, further comprising a connector locking protrusion provided in an outward protruding manner on a portion of the wall surface of the outer combination unit that is opposite in direction to the first side of the connector hook.

4. The cable coupling connector of claim 3, further comprising a locking groove provided in an inner surface of the pressing portion on the plug, wherein the connector locking protrusion is configured to be locked to the locking groove by being inserted thereinto.

5. The cable coupling connector of claim 1, wherein the pressing portion on the plug is configured to be pressed and to return to an original shape thereof due to elasticity of a wall of the plug.

6. The cable coupling connector of claim 1, further comprising a flange portion provided between the coupling cap unit and the inner combination unit in the inner connector, wherein the flange portion is configured to be installed on the vehicle body such that the coupling cap unit is arranged inside of the vehicle body and the inner combination unit is arranged outside of the vehicle body.

7. The cable coupling connector of claim 1, wherein a direction in which the slide lever is inserted between the outer combination unit and the inner combination unit and a direction in which the pressing portion provided on the plug is pressed are opposite directions.

8. A cable coupling connector for a vehicle door, the cable coupling connector comprising:

an outer connector comprising a terminal housing as a lower portion thereof and an outer combination unit as an upper portion thereof, wherein a connector hook is provided on the outer combination unit;

an inner connector comprising a coupling cap unit as a lower portion thereof and a terminal unit and an inner combination unit as an upper portion thereof, wherein the coupling cap unit is configured to be coupled to a cable inside of a vehicle body, wherein the terminal unit extends from the coupling cap unit, and wherein the inner combination unit is configured to be coupled with the outer combination unit by being inserted thereinto while surrounding lateral sides of the terminal unit;

a plug covering the outer combination unit, wherein the plug is configured to be connected to a cable pulled out of the vehicle door, wherein the plug is connected to the terminal unit, and wherein a pressing portion is provided on the plug; and a slide lever inserted between the outer combination unit and the inner combination unit and pressing against the connector hook toward a direction of the pressing portion to lock the connector hook to the pressing portion and to couple the outer connector and the plug with each other, wherein the slide lever comprises:

a lever handler;

a slide bar extending from the lever handler and inserted between the outer combination unit and the inner combination unit;

a guide protrusion provided in an inward protruding manner on an inner surface of the slide bar;

a lever hook provided on the slide bar in a shape of a quadrilateral cantilever from the slide bar, wherein a first side of the lever hook is not separated from the slide bar such that the lever hook is rotatable from an inside outward about the first side of the lever hook;

a lever pressing protrusion provided in an inward protruding manner on an inner surface of the lever hook; and a lever locking protrusion provided in an outward protruding manner on a portion of the slide bar that is opposite in direction to the first side of the lever hook.

9. The cable coupling connector of claim 8, further comprising a guide rail on an outer surface of the inner combination unit of the inner connector, wherein the guide rail is configured to guide the guide protrusion through a movement path while the slide lever is inserted between the outer combination unit and the inner combination unit.

10. The cable coupling connector of claim 9, further comprising a protruding inclination portion in an area near the guide rail, wherein the protruding inclination portion defines an inclined surface gradually protruding outward along a direction in which the slide lever is inserted on a path along which the lever hook is rotated.

11. The cable coupling connector of claim 10, wherein the connector hook of the outer connector has a shape of a quadrilateral cantilever extending from a wall surface of the outer combination unit, and wherein a first side of the connector hook is not separated from the wall surface of the outer combination unit such that the connector hook is rotatable from an inside outward about the first side of the connector hook.

12. The cable coupling connector of claim 11, further comprising a connector locking protrusion provided in an outward protruding manner on a portion of the wall surface of the outer combination unit that is opposite in direction to the first side of the connector hook.

13. The cable coupling connector of claim 12, wherein, in a state in which the slide lever is inserted between the outer combination unit and the inner combination unit, the lever pressing protrusion on the lever hook is brought into contact with the protruding inclination portion, thereby rotating the lever hook outward such that the lever locking protrusion presses against the connector locking protrusion on the outer connector to rotate the connector hook outward.

14. The cable coupling connector of claim 13, wherein in the state in which the slide lever is inserted between the outer combination unit and the inner combination unit, the lever hook is configured to be rotated outward to rotate the connector hook outward such that the connector hook is locked to the pressing portion.

15. The cable coupling connector of claim 14, wherein, in a state in which the pressing portion is pressed from an outside inward, the connector hook is rotated inward and unlocked from the pressing portion.

16. The cable coupling connector of claim 14, wherein:

in a state in which the pressing portion is pressed from an outside inward, the connector hook is rotated inward to rotate the lever hook inward; and in a state in which the lever hook is rotated inward, the lever pressing protrusion on the lever hook is configured to slide along the protruding inclination portion such that the slide lever is pulled out from between the outer combination unit and the inner combination unit.

17. The cable coupling connector of claim 8, wherein:

the connector hook of the outer connector is provided as a pair of connector hooks arranged to be symmetrical about an imaginary line extending in a direction in which the slide lever is inserted;

the lever hook of the slide lever is provided as a pair of lever hooks arranged to be symmetrical about the imaginary line; and the pressing portion on the plug is provided as a pair of pressing portions arranged to be symmetrical about the imaginary line.

18. The cable coupling connector of claim 8, further comprising:

a first lever insertion opening provided in a wall surface of the outer combination unit, wherein the slide bar of the slide lever is inserted in the first lever insertion opening;

a second lever insertion opening provided in a wall surface of the plug, wherein the slide bar of the slide lever is inserted in the second lever insertion opening; and the first lever insertion opening and the second lever insertion opening are configured to communicate with each other.

* * * * *